United States Patent [19]

Hahn

[11] 4,305,372
[45] Dec. 15, 1981

[54] PLURAL CHAMBER GAS BURNER

[75] Inventor: Linus K. Hahn, Aurora, Ohio

[73] Assignee: Columbia Industries Corporation, Palo Alto, Calif.

[21] Appl. No.: 153,256

[22] Filed: May 27, 1980

[51] Int. Cl.³ .................. A47J 37/00; F24C 3/00; F23Q 9/00; H62C 31/00

[52] U.S. Cl. ................ 126/41 R; 126/39 E; 431/278; 431/354; 239/444

[58] Field of Search .............. 126/39 E, 41 R; 431/278, 354, 356; 239/444

[56] References Cited

U.S. PATENT DOCUMENTS 3,496,926  2/1970  Kemp et al. .................. 126/39 E
3,638,635  2/1972  Drennan ....................... 431/278
4,055,132 10/1977  Stohrer, Jr. .................. 126/39 E Primary Examiner—Albert W. Davis
Assistant Examiner—Wesley S. Ratliff, Jr.
Attorney, Agent, or Firm—Squire, Sanders & Dempsey

[57] ABSTRACT

The invention provides a plural chamber gas burner for a cooking grill. The burner has an inside space between a top and a bottom. Divider walls divide the inside space into a breather space between two independently operable gas chambers. Breather apertures in the bottom of the burner provide communication between the breather space and the outside of the burner. Ignition apertures are provided in the divider walls near burner apertures in the gas chambers so that gas from an already operating gas chamber will ignite gas of another gas chamber.

12 Claims, 9 Drawing Figures

PLURAL CHAMBER GAS BURNER

My invention relates to gas burners for cooking grills and particularly gas burners which have a plural number of independently controllable gas chambers.

In the use of gas burners for cooking grills it is desirable to have a burner which is divided into several chambers, each of which can be independently operated. For example, it is often desirable to operate only half the burner at one time.

U.S. Pat. No. 3,638,635 to Drennan discloses a gas burner with an integral cast hollow structure and having two distinct, independently controlled burner portions. Drennan uses a vertically disposed integrally cast internal partition to separate the interior of the hollow structure into two generally equal portions.

U.S. Pat. No. 4,092,975 to Grammatopoulos discloses a plural chamber gas cooking grill burner formed of two sheet metal shells which form the top and bottom of the burner. Grammatopoulos has a depressed planar portion on both the top and bottom. These planar portions are arranged to abut one another so as to form a gas-tight seal, thereby dividing the burner into two separate burner chambers.

FIGS. 2 and 3 show bottom plan and partial sectional views, respectively, of further examples of prior art burners. In this case there are two separate burners 201, 202. Each burner comprises a sheet metal top 203, 204 and a sheet metal bottom 205, 206 with an end wall 207, 208 welded to the top and bottom. Burner apertures 209, 210 are provided along the periphery of each bottom member. A gas feeder aperture 211, 212 is provided in each bottom member. Each burner is separately controllable since they are in fact two separate structures.

FIGS. 4 and 5 show bottom plan and partial sectional views, respectively, of still another example of a prior art burner. This burner 401 has a unitary sheet metal top member 403 and two sheet metal bottom members 405, 406. Each bottom member has a series of burner apertures 409, 410 along its periphery and a centrally located gas feeder aperture 411, 412. A pair of divider walls 407, 408 are spot welded to each bottom member 405, 406 and pressed against the top member 403 without being welded to it. A seam or gap 413 is left between the two bottom members.

Plural chamber gas burners made from sheet metal, rather than for example cast burners, are highly desirable because they are easy and inexpensive to construct. In addition, it is desirable to construct burners from as few pieces of sheet metal as possible in order to reduce or simplify the number of fabrication steps required and to produce a stronger, more rigid burner.

A problem faced in making plural chamber gas burners is the insuring of adequate gas separation between the chambers. If too much gas is allowed to leak into and burn in an adjacent burner, the adjacent burner will not operate at the desired intensity. In burners of sheet metal construction using a single divider wall, this problem is aggravated by the buckling and expansion of the top member during use (temperatures of over 900° C. can be encountered) which causes the divider wall to separate from the top member and allow gas to leak into adjacent chambers.

On the other hand, a complete separation between burner chambers sometimes requires the separate lighting of an adjacent chamber even after a portion of the burner is in use.

The plural chamber burner of my invention is easy and inexpensive to construct, but nevertheless provides a rigid and durable structure. It has gas separation between its chambers sufficient to allow independent control of each chamber. It also has a construction which allows the automatic lighting of the gas in one chamber when an adjacent chamber is already in use.

In its preferred embodiments, my plural chamber gas burner has a unitary top member of sheet metal and a unitary bottom member of sheet metal. The top and bottom members are in sealing engagement along their peripheries to form an interior space. A pair of divider walls serve to divide the interior space into two gas chambers with a breather space in between them. Each gas chamber has burner apertures supplied along the periphery of one of the members and a gas feeder aperture in the bottom member. Breather apertures are supplied in the bottom member between the two divider walls so as to give communication between the inside breather space and the outside of the burner. Preferably, these breather apertures are only near the periphery of the bottom member, and the central portion of that part the bottom member which is next to the breather spacer is gas-tight. In addition, an ignition aperture is provided in each divider wall near the burner apertures so that gas from an already operating gas chamber will ignite gas of another gas chamber, but the ignition apertures are small enough to permit independent operation of the gas chambers.

DESCRIPTION OF THE PREFERRED EMBODIMENTS

Figure 1:
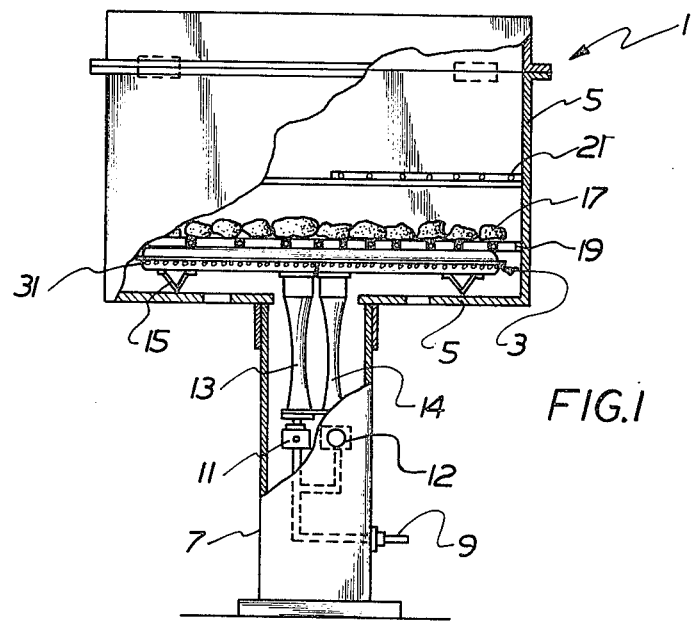
FIG. 1 is a side elevational view, partially in section, of a cooking grill incorporating a plural chamber gas chamber according to my invention.
Figure 2:
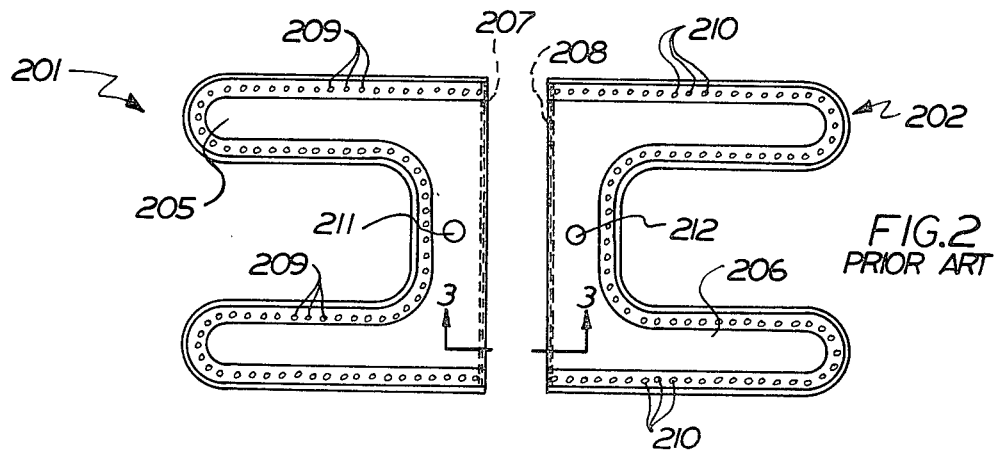
FIG. 2 is a bottom plan view of a pair of prior art burners.
Figure 3:
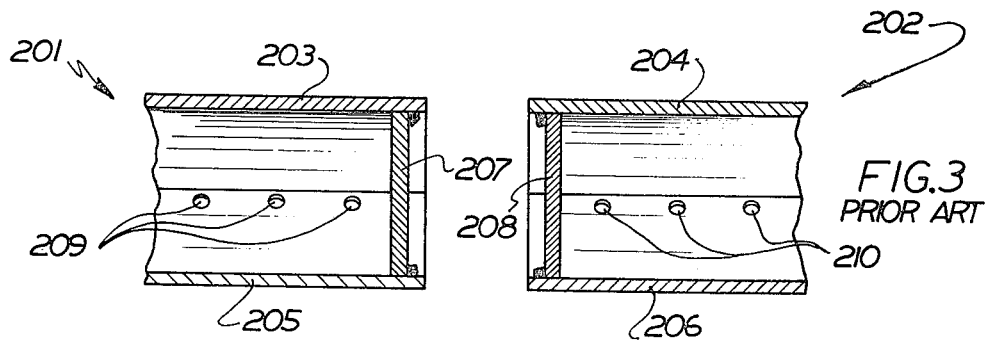
FIG. 3 is a partial sectional view taken along line 3—3 of FIG. 2.
Figure 4:
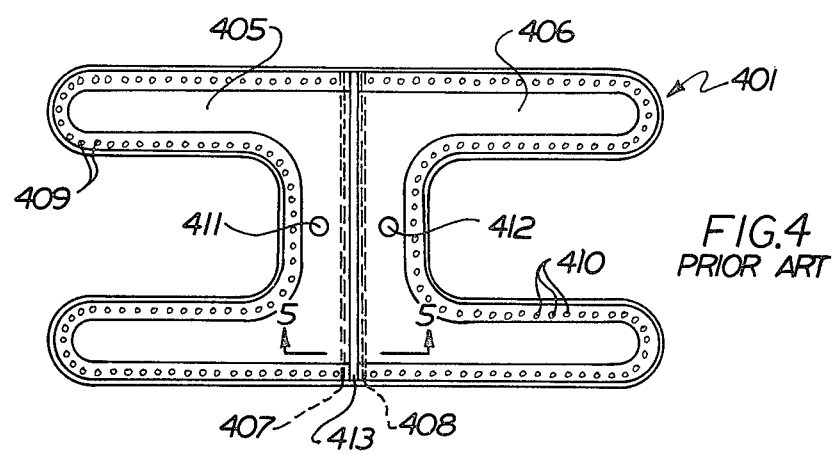
FIG. 4 is a bottom plan view of another prior art burner.
Figure 5:
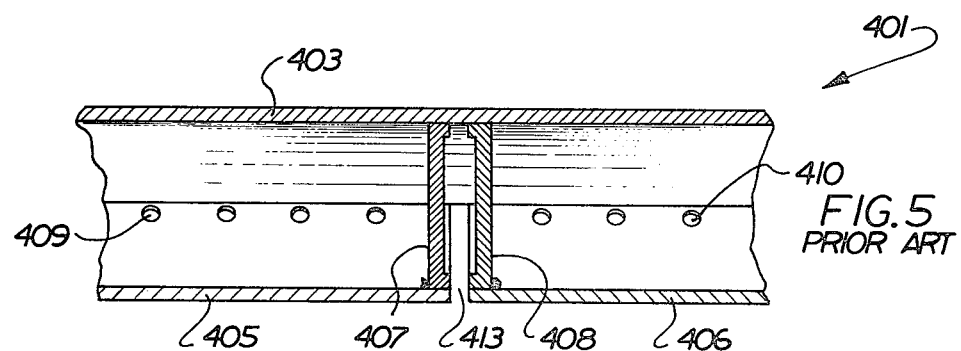
FIG. 5 is a partial sectional view taken along line 5—5 of FIG. 4.

FIG. 1 shows an otherwise conventional cooking grill 1 using a plural chamber gas burner 3 according to my invention. The grill has a housing 5 mounted on a hollow column 7. A gas supply line 9 is received within the column and branches to two separate gas controls 11, 12. Each gas control controls the flow of gas into one end of a venturi delivery tube 13, 14. The other end of each venturi delivery tube delivers gas into a separate burner chamber in the burner 3 through an aperture in the bottom of the burner. The burner has several support feet 15 by which it rests inside the bottom of the housing 5. A layer of briquets 17 rest on a grate 19 above the burner 3. A food rack 21 is mounted above the briquets. In operation gas is delivered to the burner chambers inside the burner 3 and gas then exits through a plurality of peripheral burner apertures 31 in the burner 3. The gas is ignited and thereafter burns as it exits from the burner apertures. Food is placed on the rack 21 and is cooked by the heat of the burning gas. In addition, juices from the cooking food drip onto the briquets 17 where those juices are vaporized and provide the characteristic flavors of the food during cooking.

Figure 7:
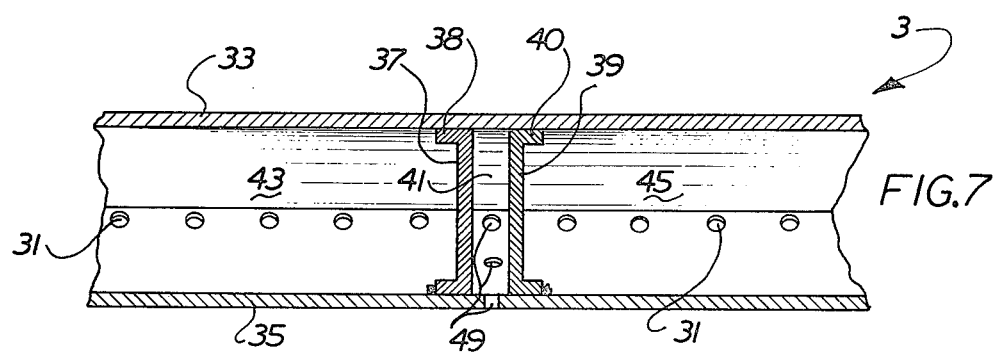
FIG. 7 is a partial sectional view along line 7—7 of FIG. 6.
Figure 8:
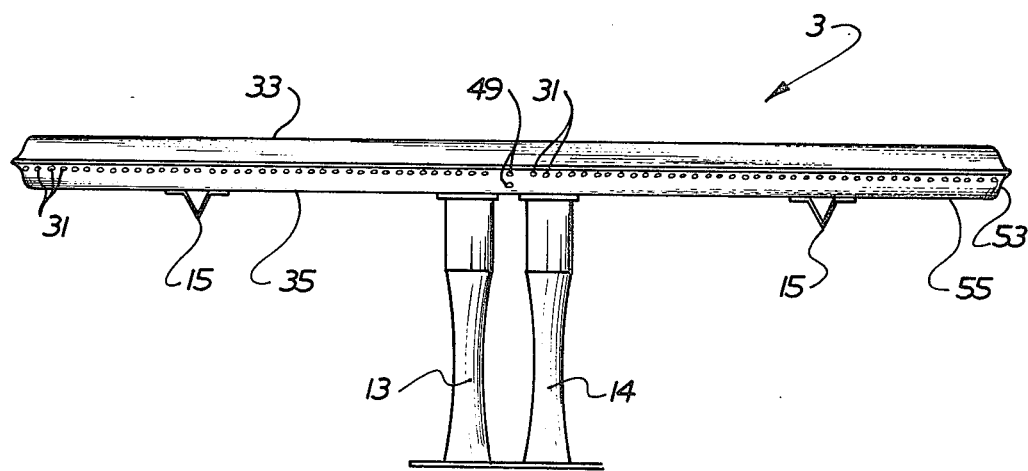
FIG. 8 is a side elevational view of the burner of FIG. 6 but with support feet and venturi delivery tubes added.
Figure 9:
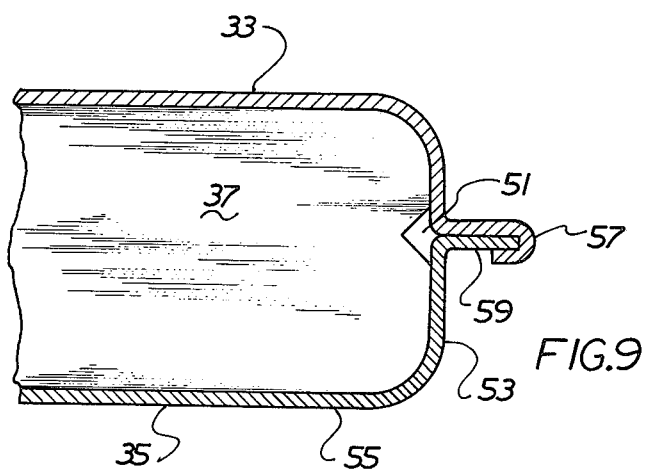
FIG. 9 is a partial sectional view taken along line 9—9 of FIG. 6.

FIGS. 6, 7, 8, and 9 more particularly show the unique features of the preferred embodiment of my plural chamber gas burner. The burner structure 3 comprises a unitary sheet metal top member 33 and a unitary sheet metal bottom member 35. The bottom member has a generally planar midsection 55 with upwardly extended convexly curved sides 53 which terminate in a periphery which is in sealing engagement with the periphery of the top member 33. The top member is similarly formed. The top member's periphery 57 is slightly larger than the bottom member's periphery 59 and, as is best seen in FIG. 9, the periphery of the top member is bent around and clamped against the periphery of the bottom member to form a substantially gas-tight seal between the inside and the outside of the burner.

A pair of divider walls 37, 39 are mounted between the top and bottom members. Preferably, the divider walls are spot welded to the bottom member 35 and are simply pressed in close engagement against the top member 33. A fairly gas-tight engagement with the top member is achieved by means of engagement members 38, 40 formed along the length of divider walls 37, 39. These engagement members 38, 40 are made by bending a portion of the divider walls less than 90° from the plane of the main portion of the divider wall. The divider walls 37, 39 are then attached to the bottom member 35, and then the top and bottom members are assembled. The divider walls are pressed against the top member and the engagement members 38, 40 are thereby further bent to make about a 90° angle with the plane of the main portion of the divider walls 37, 39 and to make tight contact against the top member.

As can best be seen in FIG. 7, the two divider walls 37, 39 divide the inside space of the burner into three parts. One part of the inside is a breather space 41 formed between the two divider walls. The other two parts of the inside are gas chambers 43, 45 formed on each side of the breather space 41.

Burner apertures 31 are provided along the periphery of the bottom member adjacent each gas chamber 43, 45 in order to provide communication between each of the gas chambers and to ambient air outside of the burner. The burner apertures can be placed elsewhere in the bottom member or even in the top member, but the periphery of the bottom member is preferred. Each of the gas chambers 43, 45 has a gas feeder aperture 47, 48 centrally located in the bottom member 35 for communication between a venturi delivery tube and the gas chamber. During operation gas is admitted into a gas chamber through a gas feeder aperture and exits through burner apertures where it is ignited and burns. Because the gas chambers 43, 45 are separated by the divider walls 37, 39 and the breather space 41, each gas chamber can be separately operated and controlled.

My plural chamber gas burner is provided with breather apertures 49 in the bottom member 35 adjacent the breather space 41. These breather apertures can be all the way across the bottom, but for reasons discussed below this is not preferred. These breather apertures permit communication between the inside breather space 41 and the ambient air outside of the burner. The function of these breather apertures is to permit the exit of gas from the breather space 41. Thus, gas which may leak past one of the divider walls into the breather space can exit through the breather apertures.

This construction substantially improves the gas separation between the two gas chambers over, for example, a burner having a unitary sheet metal top and a unitary sheet metal bottom with only a single divider wall between two gas chambers and no breather space. In such a single divider wall construction there is a greater tendency to have gas leakage from one gas chamber to another.

Figure 6:
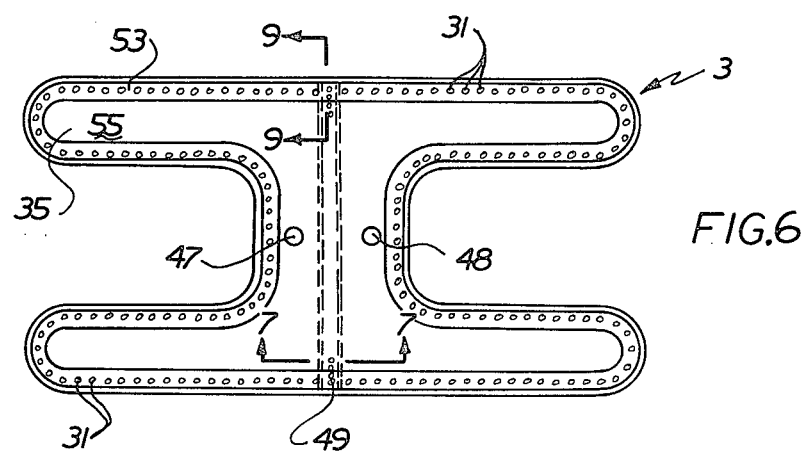
FIG. 6 is a bottom plan view of a burner according to my invention.

In its preferred embodiments, as can best be seen in FIG. 6, my burner has breather apertures 49 only at and near the periphery of the bottom member. More specifically, each of the breather apertures is closer to the periphery of the bottom member than to the center of the bottom member. This is done so that, except for the breather apertures 49, the bottom member 35 presents a gas-tight surface to the breather space 41. Thus, the central portion of the midsection of the bottom member adjacent to the breather space is imperforate. Therefore, it can be said that the midsection of the bottom member adjacent to the breather space is substantially gas-tight because the only communication between the inside breather space and the outside of the burner is through the breather apertures which are near the periphery. By this arrangement of the breather apertures, most of the gas exiting from the breather space exits in a principally sideward direction and only somewhat, if at all, in a downward direction. Thus, it can be said that the breather apertures give essentially sideward communication between the breather space and the outside of the burner. As can be seen in FIGS. 6, 7, and 8, the breather apertures are most preferably at (that is, in or next to) the upwardly extending convexly curved sides of the bottom member.

There are several reasons for having the breather apertures near the periphery of the bottom member and not all the way across the bottom. There is no need for breather apertures all the way across the bottom because a few near the sides are sufficient. Apertures all the way across the bottom unnecessarily weaken the burner structure, and purposelessly increase the cost of fabrication. Furthermore, it is desirable to have any gas exiting from the breather space exit near the burner apertures of the adjoining gas chambers so that the gas can be ignited by burning gas from a gas chamber and burn near where the other gas is already burning. In addition, cold gas is often heavier than air and, by having a substantially gas-tight midsection to the bottom member, such cold gas is retarded from exiting downward from the burner and so the hazard of having gas collect in the bottom of the grill housing is reduced.

Breather apertures can be placed in the top member instead of or in addition to the bottom member, but it is preferable to place them in the bottom member in order to give a more pleasant appearance to the top member.

Another feature of the preferred embodiments of my burner is best seen in FIG. 9. There is an open notch 51 in the end of dividing wall 37. This notch permits a slight amount of gas communication between gas chamber 43 and breather space 41. Most preferably this notch is in line with and right at a burner aperture for the adjacent gas chamber. Instead of a notch, a small hole can be placed in the divider wall, preferably about as high up as the periphery of the bottom member and near that periphery. Such a notch or small hole can be referred to as an ignition aperture. Preferably there is an ignition aperture at each end of each divider wall, and the ignition apertures on the two walls are placed near each other and also near the burner apertures in the adjoining gas chambers.

These ignition apertures perform two functions. The first function is to provide part of a path by which a small amount of hot or burning gas from one gas chamber can contact gas from the other gas chamber so that, if for example the other gas chamber is turned on after the first gas chamber is already operating, the gas from the first gas chamber will ignite the gas from the second chamber. In order to accomplish this function, the ignition apertures are made big enough to permit such ignition but kept small enough to prevent larger amounts of gas from traveling between gas chambers. When one gas chamber is operating and the other is idle, some gas from the operating chamber travels through the ignition apertures but the amount of that gas is small enough that most or all of that gas is intercepted by the breather space and exits through breather apertures and does not enter the idle chamber. By this construction each gas chamber can be independently operated and controlled. The second function is to control leakage of gas across a divider wall from a gas chamber into the breather space. Some leakage is not unlikely to occur, especially after long use. The leaking gas will tend to follow the easiest path available and the ignition apertures present an easy path which has the advantage of directing the gas towards the burner apertures where the leaking gas can be burned with the other gas.

These dual functions of the ignition apertures could be achieved by having fewer than four ignition apertures. For example, if the divider walls are close together and a burner aperture for each gas chamber is close to the divider walls, a single ignition aperture in one divider wall would suffice. However, I prefer to have ignition apertures at each end of each divider wall. In any event, in order to perform the ignition function, the distance along the path from gas chamber through one or more of the ignition apertures to the other gas chamber must be short enough to allow gas from one chamber to ignite gas from the other chamber. This path can follow a number of routes. For example, if the breather space is sufficiently narrow, the path can go from one gas chamber through an ignition aperture out a breather aperture to a burner aperture for the other gas chamber. Preferably the burner is provided with ignition apertures at corresponding ends of both divider walls, with each ignition aperture being proximate to a burner aperture for the adjacent gas chamber, and the ignition apertures on the two divider walls being proximate to each other, so that there is a path going from a burner aperture in one gas chamber through two corresponding ignition apertures to a burner aperture in the other gas chamber.

Ignition apertures can also be useful in a plural chamber gas burner having a single divider wall. For example, a single ignition aperture near burner apertures for each gas chamber can be sufficient for the ignition function. A pair of ignition apertures, one at each end of the single divider wall, helps to control the flow of leaking gas by directing the gas near the burner apertures where it can burn off. The ignition apertures should be made small enough so that the amount of gas going through the ignition aperture from an operating gas chamber to an idle gas chamber burns off at the first few burner apertures of the idle gas chamber and therefore does not substantially affect the independent operability and controllability of the gas chambers.

In its preferred embodiments my plural chamber gas burner provides a durable and inexpensive gas burner having a plurality of independently operable and controllable gas burning parts. In addition, one part can be automatically ignited from an already operating part.

The invention has been described in detail with particular emphasis on the preferred embodiments, but it should be understood that there are variations and modifications within the scope and spirit of the invention.

What I claim is:

1. A plural chamber gas burner for use in a cooking grill, comprising:
   a structure having a top and bottom, said top and bottom defining an inside space;
   at least one divider wall extending between said top and bottom dividing said inside space into first and second independently operable gas chambers;
   a plurality of burner apertures in said structure for communication between each gas chamber and the ambient air;
   gas feeder apertures in said structure for communication between each gas chamber and a source of gas; and
   at least one ignition aperture in said divider wall forming part of a path from one gas chamber to the other gas chamber sufficient to permit gas from one gas chamber to ignite gas from the other gas chamber, the size of said ignition aperture being small enough to permit independent operation of said gas chambers.

2. A plural chamber gas burner for use in a cooking grill, comprising:
   a structure comprising a top and a bottom, said top and bottom defining an inside space;
   first and second divider walls extending between said top and bottom dividing said inside space into an intermediate breather space between first and second independently operable gas chambers;
   a plurality of burner apertures in said structure for communication between each gas chamber and the ambient air;
   gas feeder apertures in said structure for communication between each gas chamber and a source of gas; and
   a plurality of breather apertures in said structure for communication between said breather space and the ambient air.

3. The invention of claim 2, wherein said breather apertures provide essentially sideward communication between said breather space and the ambient air.

4. The invention of claim 2, further comprising:
   at least one ignition aperture in a divider wall forming part of a path from one gas chamber to the other gas chamber sufficient to permit gas from one gas chamber to ignite gas from the other gas chamber, the size of said ignition aperture being small enough to permit independent operation of said gas chambers.

5. The invention of claim 4, further comprising:
   a first ignition aperture in said first divider wall proximate to at least one of said burner apertures for said first gas chamber; and
   a second ignition aperture in said second divider wall proximate to at least one of said burner apertures for said second gas chamber and proximate to said first ignition aperture, the sum of the sizes of said ignition apertures being small enough to permit independent operation of said gas chambers.

6. The invention of claim 5, further comprising:
a third ignition aperture in said first divider wall at the opposing end of said first divider from said first ignition aperture and proximate to at least one of said burner apertures for said first gas chamber; and
a fourth ignition aperture in said second divider wall proximate to at least one of said burner apertures for said second gas chamber and proximate to said third ignition aperture, the sum of the sizes of said ignition apertures being small enough to permit independent operation of said gas chambers.

7. The invention of claims 2, 3, 4, 5 or 6, wherein said top comprises a top member with a periphery, and said bottom comprises a bottom member with a periphery and a center, said periphery of said top member being in sealing engagement with said periphery of said bottom member, said burner apertures being along said periphery of one of said members, and said breather apertures being in said bottom member and near said periphery of said bottom member.

8. The invention of claim 7, wherein each said breather aperture is closer to said periphery of said bottom member than to said center of said bottom member.

9. The invention of claim 8, wherein the portion of said bottom member adjacent said breather space is gas-tight except for said breather apertures.

10. The invention of claims 2, 3, 4, 5 or 6, wherein said top comprises a member formed from a single sheet of metal and said bottom comprises a member formed from a single sheet of metal.

11. The invention of claim 10, wherein said bottom member has a generally planar midsection and upwardly extending sides terminating in a periphery in sealing engagement with said top member, wherein said breather apertures are in said bottom member, wherein said midsection is substantially gas-tight, and wherein said burner apertures are at said sides of said bottom member.

12. The invention of claim 10, wherein said bottom member has a generally planar midsection and upwardly extending convexly curved sides terminating in a periphery in sealing engagement with said top member, wherein said breather apertures and said burner apertures are at said sides of said bottom member and the central portion of said midsection adjacent to said breather space is imperforate.

* * * * *